United States Patent

Hon et al.

[11] Patent Number: 5,963,903
[45] Date of Patent: Oct. 5, 1999

[54] METHOD AND SYSTEM FOR DYNAMICALLY ADJUSTED TRAINING FOR SPEECH RECOGNITION

[75] Inventors: Hsiao-Wuen Hon, Woodinville; Xuedong D. Huang; Mei-Yuh Hwang, both of Redmond; Li Jiang; Yun-Cheng Ju, both of Bellevue; Milind V. Mahajan, Redmond; Michael J. Rozak, Issaquah, all of Wash.

[73] Assignee: Microsoft Corporation, Redmond, Wash.

[21] Appl. No.: 08/673,435

[22] Filed: Jun. 28, 1996

[51] Int. Cl.⁶ .................................................. G10L 5/04
[52] U.S. Cl. ......................................... 704/254; 704/240
[58] Field of Search ................................. 704/277, 238, 704/200, 243, 222, 256, 244, 254, 257, 239, 240, 251, 249, 246, 234, 231

[56] References Cited

U.S. PATENT DOCUMENTS

| | | | |
|---|---|---|---|
| 4,783,803 | 11/1988 | Baker et al. | 381/42 |
| 4,866,778 | 9/1989 | Baker | 381/43 |
| 5,027,406 | 6/1991 | Roberts et al. | 704/244 |
| 5,050,215 | 9/1991 | Nishimura | 704/256 |
| 5,182,773 | 1/1993 | Bahl et al. | 704/222 |
| 5,278,942 | 1/1994 | Bahl et al. | 704/200 |
| 5,293,584 | 3/1994 | Brown et al. | 704/277 |
| 5,390,278 | 2/1995 | Gupta et al. | 395/2.52 |
| 5,455,889 | 10/1995 | Bahl et al. | 704/236 |
| 5,465,318 | 11/1995 | Sejnoha | 704/243 |
| 5,682,464 | 10/1997 | Sejnoha | 704/238 |
| 5,682,501 | 10/1997 | Sharman | 704/260 |
| 5,715,367 | 2/1998 | Gillick et al. | 704/254 |

FOREIGN PATENT DOCUMENTS

| | | | |
|---|---|---|---|
| 0623914A1 | 11/1994 | European Pat. Off. | G10L 5/06 |
| 0706171A1 | 4/1996 | European Pat. Off. | G10L 5/00 |

OTHER PUBLICATIONS

Benet, Bernard, "Dictation Systems for Windows: Dragon, IBM, Kurzweil; Dragon Systems' DragonDictate, IBM's VoiceType Dictation, Kurzweil AI's Kurzweil Voice 1.2; Software Review; Evaluation," The Seybold Report on Desktop Publishing, Seybold Publications, Inc., Jun. 10, 1995, vol. 9, No. 10, p. 12.

"IBM Voice Recognition Explored at Seminar," *The Legal Intelligencer*, Legal Communications, Ltd., Oct. 5, 1995, p. 2.

Kurzweil Applied Intelligence, Inc., 1997, http://www.1hs.com/kurzweil/company/default.htm, [Accessed Oct. 13, 1997].

Rabiner, Lawrence R., "A Tutorial on Hidden Markov Models and Selected Applications in Speech Recognition," IEEE Log No. 8825949, 1989, pp. 267–295.

*Primary Examiner*—Richemond Dorvil
*Attorney, Agent, or Firm*—Westman, Champlin & Kelly, P.A.

[57] ABSTRACT

A method and system for dynamically selecting words for training a speech recognition system. The speech recognition system models each phoneme using a hidden Markov model and represents each word as a sequence of phonemes. The training system ranks each phoneme for each frame according to the probability that the corresponding codeword will be spoken as part of the phoneme. The training system collects spoken utterances for which the corresponding word is known. The training system then aligns the codewords of each utterance with the phoneme that it is recognized to be part of. The training system then calculates an average rank for each phoneme using the aligned codewords for the aligned frames. Finally, the training system selects words for training that contain phonemes with a low rank.

116 Claims, 11 Drawing Sheets

Fig. 1 *Prior Art*

WORD = 10 + 12 + 2    CODEWORD SEQUENCE = 5, 10, 255, 2, 3, 50, 32, 256, 6,
                                          4, 6, 100, 2, 3, 5

FRAME/PHONEME ALIGNMENT TABLE

PHONEMES

| FRAMES | 10 | 12 | 2 |
|---|---|---|---|
| 1 | 5 | | |
| 2 | 10 | | |
| 3 | 255 | | |
| 4 | 2 | | |
| 5 | | 3 | |
| 6 | | 50 | |
| 7 | | 32 | |
| 8 | | 256 | |
| 9 | | 6 | |
| 10 | | 4 | |
| 11 | | | 6 |
| 12 | | | 10 |
| 13 | | | 2 |
| 14 | | | 3 |
| 15 | | | 5 |

CODEWORD/PHONEME PROBABILITY TABLE

|  | PHONEME | | | | | |
|---|---|---|---|---|---|---|
| CODEWORD | 1 | 2 | 3 ... | 10 ... | 12 ... | 40 |
| 1 | .2 | .05 | .14 | .06 | .001 | .15 |
| 2 | .02 | .001 | .03 | .25 | .06 | .05 |
| 3 | .002 | .25 | .004 | .04 | .02 | .001 |
| 4 | .04 | .03 | .05 | .002 | .1 | .3 |
| 5 | .02 | .2 | .04 | .03 | .025 | .021 |
| 6 | .1 | .07 | .08 | .01 | .02 | .05 |
| ⋮ | | | | | | |
| 10 | .007 | .03 | .04 | .005 | .006 | .1 |
| ⋮ | | | | | | |
| 32 | .04 | .03 | .4 | .1 | .15 | .02 |
| ⋮ | | | | | | |
| 50 | .006 | .002 | .2 | .007 | .01 | .005 |
| ⋮ | | | | | | |
| 255 | .01 | .03 | .05 | .02 | .015 | .2 |
| 256 | .2 | .09 | .06 | .001 | .07 | .05 |

*Fig. 5A*

CODEWORD/PHONEME RANK TABLE

PHONEME

| | | 1 | 2 | 3 ... | 10 ... | 12 ... | 40 |
|---|---|---|---|---|---|---|---|
| | 1 | 5 | 25 | 13 | 23 | 39 | 6 |
| | 2 | 17 | 40 | 21 | 1 | 5 | 8 |
| | 3 | 36 | 2 | 27 | 6 | 10 | 37 |
| | 4 | 15 | 16 | 11 | 36 | 5 | 1 |
| | 5 | 23 | 3 | 15 | 19 | 20 | 22 |
| CODEWORD | 6 | 5 | 12 | 7 | 33 | 29 | 16 |
| | ⋮ | | | | | | |
| | 10 | 24 | 18 | 17 | 31 | 27 | 4 |
| | ⋮ | | | | | | |
| | 32 | 15 | 16 | 1 | 5 | 4 | 23 |
| | ⋮ | | | | | | |
| | 50 | 26 | 35 | 6 | 25 | 14 | 27 |
| | ⋮ | | | | | | |
| | 255 | 26 | 10 | 6 | 15 | 24 | 1 |
| | 256 | 2 | 4 | 18 | 37 | 17 | 21 |

*Fig. 5B*

| PHONEME \ FRAME | 1 | 2 | 3 | 4 | 5 |
|---|---|---|---|---|---|
| | 5 | 10 | 255 | 2 | 3 |
| 1 | 23 | 24 | 26 | 17 | 36 |
| 2 | 3 | 18 | 10 | 40 | 2 |
| ⋮ | | | | | |
| 10 | 19 | 31 | 15 | 1 | 6 |
| ⋮ | | | | | |
| 12 | 20 | 27 | 24 | 5 | 10 |

*Fig. 5C*

METHOD AND SYSTEM FOR DYNAMICALLY ADJUSTED TRAINING FOR SPEECH RECOGNITION

TECHNICAL FIELD

The present invention relates to computer speech recognition, and more particularly, to training a computer speech recognition system.

BACKGROUND OF THE INVENTION

The rapid and accurate recognition of human speech by a computer system has been a long-sought goal by developers of computer systems. The benefits that would result from such a computer speech recognition (CSR) system are substantial. For example, rather than typing a document into a computer system, a person could simply speak the words of the document, and the CSR system would recognize the words and store the letters of each word as if the words had been typed. Since people generally can speak faster than type, efficiency would be improved. Also, people would no longer need to learn how to type. Computers could also be used in many applications where their use is currently impracticable because a person's hands are occupied with tasks other than typing.

Typical CSR systems recognize words by comparing a spoken utterance to a model of each word in a vocabulary. The word whose model best matches the utterance is recognized as the spoken word. A CSR system may model each word as a sequence of phonemes that compose the word. To recognize an utterance, the CSR system identifies a word sequence, phonemes of which best match the utterance, These phonemes may, however, not exactly correspond to the phonemes that compose a word. Thus, CSR systems typically use a probability analysis to determine which word most closely corresponds to the identified phonemes.

When recognizing an utterance, a CSR system converts the analog signal representing the utterance to a more useable form for further processing. The CSR system first converts the analog signal into a digital form. The CSR system then applies a signal processing technique, such as fast fourier transforms (FFT), linear predictive coding (LPC), or filter banks, to the digital form to extract an appropriate parametric representation of the utterance. A commonly used representation is a "feature vector" with FFT or LPC coefficients that represent the frequency and/or energy bands of the utterance at various intervals (referred to as "frames"). The intervals can be short or long based on the computational capacity of the computer system and the desired accuracy of the recognition process. Typical intervals may be in the range of 10 milliseconds. That is, the CSR system would generate a feature vector for every 10 milliseconds of the utterance. Each frame is typically 25 ms long. Therefore, a 25 ms long frame is generated every 10 ms. There is an overlap between successive frames.

To facilitate the processing of the feature vectors, each feature vector is quantized into one of a limited number (e.g., 256) of "quantization vectors." That is, the CSR system defines a number of quantization vectors that are selected to represent typical or average ranges of feature vectors. The CSR system then compares each feature vector to each of the quantization vectors and selects the quantization vector that most closely resembles the feature vector to represent the feature vector. Each quantization vector is uniquely identified by a number (e.g., between 1 and 256), which is referred to as a "codeword." When a feature vector is represented as a quantization vector, there is a loss of information because many different feature vectors map to the same quantization vector. To ensure that this information loss will not seriously impact recognition, CSR systems may define thousands or millions of quantization vectors. The amount of storage needed to store the definition of such a large number of quantization vectors can be considerable. Thus, to reduce the amount of storage needed, CSR systems segment feature vectors and quantize each segment into one of a small number (e.g., 256) quantization vectors. Thus, each feature vector is represented by a quantization vector (identified by a codeword) for each segment. For simplicity of explanation, a CSR system that does not segment a feature vector and thus has only one codeword per feature vector (or frame) is described.

As discussed above, a spoken utterance often does not exactly correspond to a model of a word. The difficulty in finding an exact correspondence is due to the great variation in speech that is not completely and accurately captured by the word models. These variations result from, for example, the accent of the speaker, the speed and pitch at which a person speaks, the current health (e.g., with a cold) of the speaker, the age and sex of the speaker, etc. CSR systems that use probabilistic techniques have been more successful in accurately recognizing speech than techniques that seek an exact correspondence.

One such probabilistic technique that is commonly used for speech recognition is hidden Markov modeling. A CSR system may use a hidden Markov model ("HMM") for each word in the vocabulary. The HMM for a word includes probabilistic information from which can be derived the probability that any sequence of codewords corresponds to that word. Thus, to recognize an utterance, a CSR system converts the utterance to a sequence of codewords and then uses the HMM for each word to determine the probability that the word corresponds to the utterance. The CSR system recognizes the utterance as the word with the highest probability.

An HMM is represented by a state diagram State diagrams are traditionally used to determine a state that a system will be in after receiving a sequence of inputs. A state diagram comprises states and transitions between source and destination states. Each transition has associated with it an input which indicates that when the system receives that input and it is in the source state, the system will transition to the destination state. Such a state diagram could, for example, be used by a system that recognizes each sequence of codewords that compose the words in a vocabulary. As the system processes each codeword, the system determines the next state based on the current state and the codeword being processed. In this example, the state diagram would have a certain final state that corresponds to each word. However, if multiple pronunciations of a word are represented, then each word may have multiple final states. If after processing the codewords, the system is in a final state that corresponds to a word, then that sequence of codewords would be recognized as the word of the final state.

An HMM, however, has a probability associated with each transition from one state to another for each codeword. For example, if an HMM is in state 2, then the probability may be 0.1 that a certain codeword would cause a transition from the current state to a next state, and the probability may be 0.2 that the same codeword would cause a transition from the current state to a different next state. Similarly, the probability may be 0.01 that a different codeword would cause a transition from the current state to a next state. Since an HMM has probabilities associated with its state diagram, the determination of the final state for a given sequence of codewords can only be expressed in terms of probabilities. Thus, to determine the probability of each possible final state for a sequence of codewords, each possible sequence of states for the state diagram of the HMM needs to be identified and the associated probabilities need to be calculated. Each such sequence of states is referred to as a state path.

To simplify recognition, rather than use an HMM with a large state diagram representing the probabilities for each possible sequence of codewords for each possible word, typical CSR systems represent each possible phonetic unit with an HMM and represent each word as a sequence of the phonetic units. Traditionally, the phonetic unit has been a phoneme. However, other phonetic units, such as senones, have been used. (See Hwang et al., "Predicting Unseen Triphones with Senones," Proc. ICASSP '93, 1993, Vol. II, pp. 311–314.) With an HMM for each phonetic unit, a CSR system evaluates the probability that a sequence of phonemes represents a certain word by concatenating the HMMs for the phonemes that compose the word and evaluating the resulting HMM.

Each HMM contains for each state the probability that each codeword will result in a transition to each other state. The probabilities associated with each state transition are represented by codeword-dependent output probabilities for that state and a codeword-independent transition probabilities for the state. The codeword-dependent output probability for a state reflects the likelihood that the phoneme will contain that codeword as the next codeword after a sequence of codewords results in the HMM being in that state. The codeword-independent transition probabilities for a state indicates the probability that the HMM will transition from that state to each next state. Thus, the probability that the HMM will transition from a current state to a next state when a codeword is input is the product of the transition probability from the current state to the next state and the output probability for the received codeword.

FIG. 1 illustrates a sample HMM for a phoneme. The HMM contains three states and two transitions out of each state. Generally, CSR systems use the same state diagram to represent each phonemes, but with phoneme-dependent output and transition probabilities. According to this HMM, a transition can only occur to the same state or to the next state which models the left-to-right nature of speech. Each state has an associated output probability table and a transition probability table that contain the output and transition probabilities. As shown in FIG. 1, the output probability for codeword 5 is 0.1 when the HMM is in state 2, and the transition probability to state 3 is 0.8 when the HMM is in state 2. Thus, the probability that the HMM will transition to state 3 from state 2 when codeword 5 is received is 0.08 (i.e., 0.1×0.8).

To determine the probability that a sequence of codewords represents a phoneme, the CSR system may generate a probability lattice. The probability lattice for the HMM of a phoneme represents a calculation of the probabilities for each possible state path for the sequence of codewords. The probability lattice contains a node for each possible state that the HMM can be in for each codeword in the sequence. Each node contains the accumulated probability that the codewords processed so far will result in the HMM being in the state associated with that node. The sum of the probabilities in the nodes for a particular codeword indicates the likelihood that the codewords processed so far represent a prefix portion of the phoneme.

FIG. 2 is a diagram illustrating a probability lattice. The probability lattice represents a calculation of the probabilities for each possible state of the HMM shown in FIG. 1 when the codeword sequence "7, 5, 2, 1, 2" is processed. The horizontal axis corresponds to the codewords and vertical axis corresponds to the states of the HMM. Each node of the lattice contains the maximum probability of the probability of each source state times the output and transition probabilities, rather than the sum of the probabilities. For example, node 201 contains a probability of 8.6E-6, which is the maximum of 3.6E-4×0.01×0.9 and 1.4E-3×0.03×0.2. There are many different state paths (i.e., sequences of states) that lead to any node. For example, node 201 may be reached by state paths "1, 2, 3, 3," "1, 2, 2, 3," and "1, 1, 2, 3." Each state path has a probability that the HMM will follow that state path when processing the codeword sequence. The probability in each node is the maximum of the probabilities of each state path that leads to the node. These maximum probabilities are used for Viterbi alignment as discussed below.

FIG. 3 illustrates a probability lattice for a word. The vertical axis corresponds to the concatenation of the states of the HMM for the phonemes that compose the word. Node 301 represents a final state for the word and contains the maximum probability of all the state paths that lead to that node. The emboldened lines of FIG. 3 represent the state path with the highest probability that ends at node 301. In certain applications (e.g., training a CSR system), it is helpful to identify the state path that has the highest probability of leading to a particular node. One well-known algorithm for identifying such a state path is the Viterbi algorithm. After the Viterbi algorithm has determined the highest probability state path to the final state, it is possible to backtrace from the final node in the lattice and determine the previous node on the highest probability state path all the way back to the starting state. For example, the state path that has the highest probability of ending at node 203 of FIG. 2 is "1, 2, 2, 2, 2, 3." When the probability lattice represents the phonemes that compose a word, then each state can be identified by the phoneme and the state within the phoneme.

The accuracy of a CSR system depends, in part, on the accuracy of the accuracy of the output and transition probabilities of the HMM for each phoneme. Typical CSR systems "train" the CSR system so that the output and transition probabilities accurately reflect speech of the average speaker. During training, the CSR system gathers codeword sequences from various speakers for a large variety of words. The words are selected so that each phoneme is spoken a large number of times. From these codeword sequences, the CSR system calculates output and transition probabilities for each HMM. Various iterative approaches for calculating these probabilities are well-known and described in Huang et al., "Hidden Markov Models for Speech Recognition," Edinburgh University Press, 1990.

A problem with such training techniques, however, is that such average HMMs may not accurately model the speech of people whose speech pattern is different than the average. In general, every person will have certain speech patterns that differ from the average. Consequently, CSR systems allow a speaker to train the HMMs to adapt to the speaker's speech patterns. In such training, CSR systems refine the HMM parameters, such as the output and transition probabilities and the quantization vectors represented by the codewords, by using training utterances spoken by the actual user of the system. The adapted parameters are derived by using both the user-supplied data as well as the information and parameters generated from the large amount of speaker-independent data. Thus, the probabilities reflect speaker-dependent characteristics. One such training technique is described in Huang and Lee, "On Speaker-Independent, Speaker-Dependent, and Speaker-Adaptive Speech Recognition," Proc. ICASSP '91, 1991, pp. 877–880.

A CSR system is typically trained by presenting a large variety of pre-selected words to a speaker. These words are selected to ensure that a representative sample of speech corresponding to each phoneme can be collected. With this representative sample, the CSR system can ensure that any HMM that does not accurately reflect the speaker's pronunciation of that phoneme can be adequately adapted. When additional training is performed, for example, because the speaker is not satisfied with accuracy of the recognition, the CSR presents additional pre-selected words to the speaker.

Although the use of pre-selected words can provide adequate training, the speakers may become frustrated with having to speak a large number of words. Indeed, since the words are pre-selected to include each phoneme, the speaker is effectively asked to speak words whose phonemes are modeled with an acceptable accuracy. It would, therefore, be useful to have a training system that could dynamically select words for training that will tend to optimize the accuracy of the training and reduce the number of words that a speaker is requested to speak.

SUMMARY OF THE INVENTION

The present invention provides a method and system for dynamically selecting words for training a speech recognition system. Each word is modeled by the speech recognition system as comprising phonetic units. The training system collects spoken utterances for which the corresponding word is known. The training system identifies from the spoken utterances which phonetic units are inaccurately modeled by the speech recognition system. The training system then selects words that contain an identified phonetic unit for training of the speech recognition system.

In one aspect of the present invention, the speech recognition system models each word as a sequence of phonemes and has an HMM for each phoneme. The training system identifies which phonemes are inaccurately modeled by aligning each codeword of each utterance with the phonemes of the known word to which the collected utterance corresponds based on the phoneme models. The training system then calculates an accuracy indication that the phoneme is accurately modeled by evaluating the phonemes to which each codeword is aligned and comparing it with other phonemes.

BRIEF DESCRIPTION OF THE DRAWING

FIG. 4 shows the alignment of each codeword with a phoneme.

FIG. 5A shows the probability that each phoneme contains each codeword.

FIG. 5B shows the rank of each phoneme for each codeword.

FIG. 5C shows the ranks of each phoneme for the codeword of each frame.

DETAILED DESCRIPTION OF THE INVENTION

Figure 1:
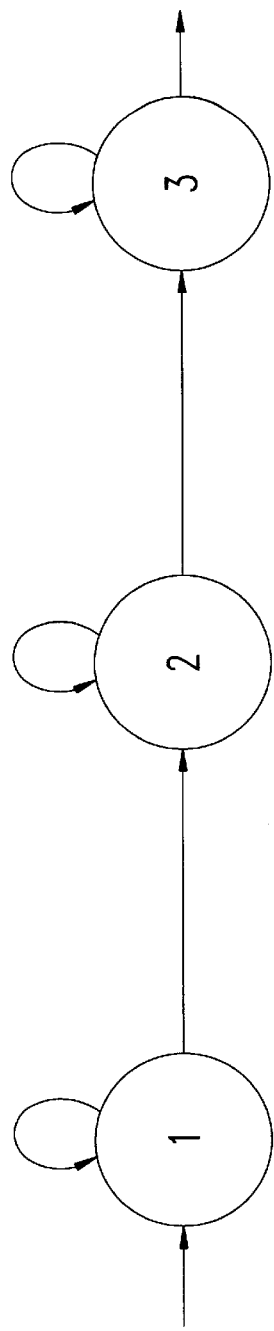
FIG. 1 illustrates a sample HMM for a phoneme.
Figure 2:
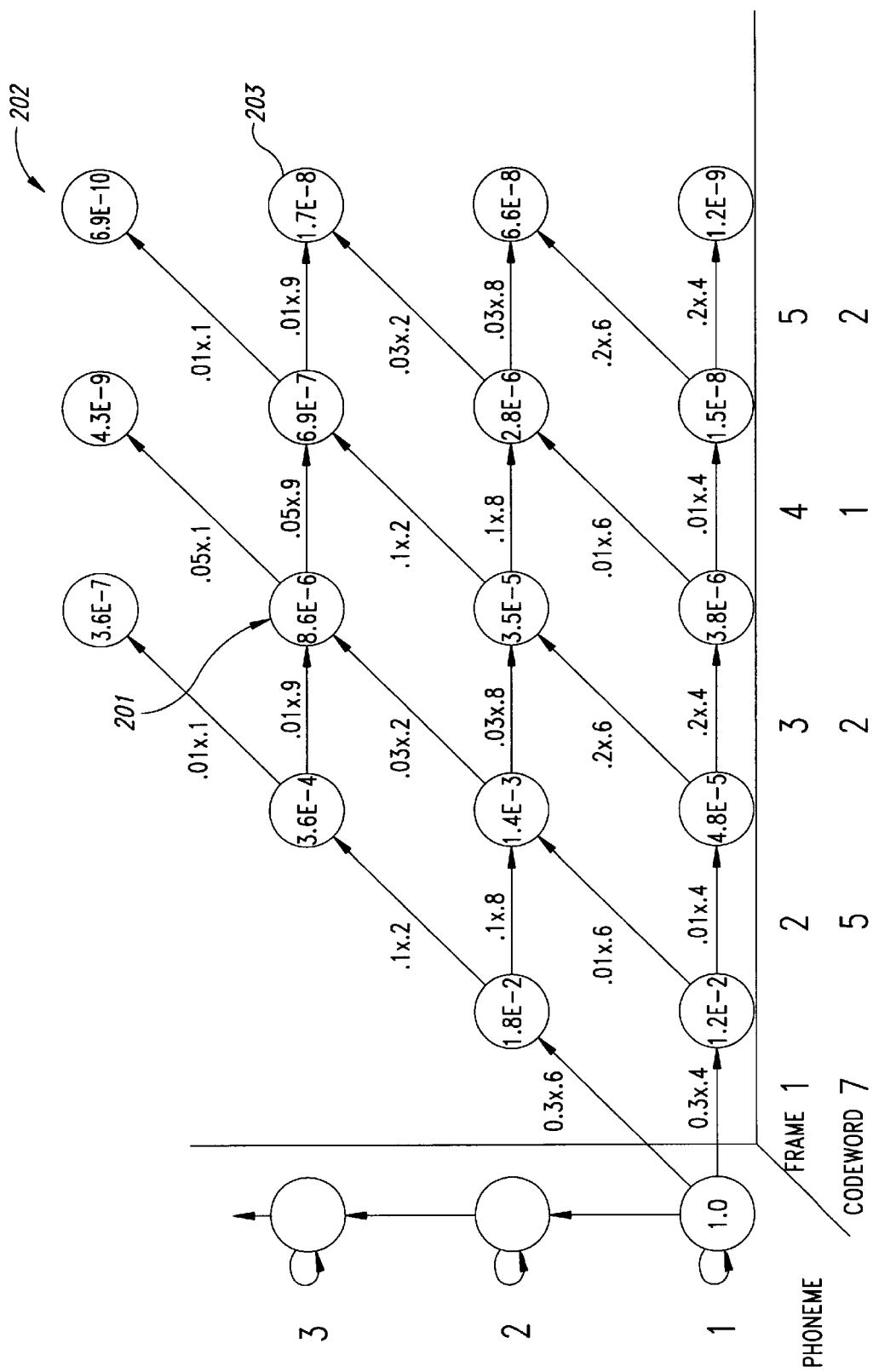
FIG. 2 is a diagram illustrating a probability lattice.
Figure 3:
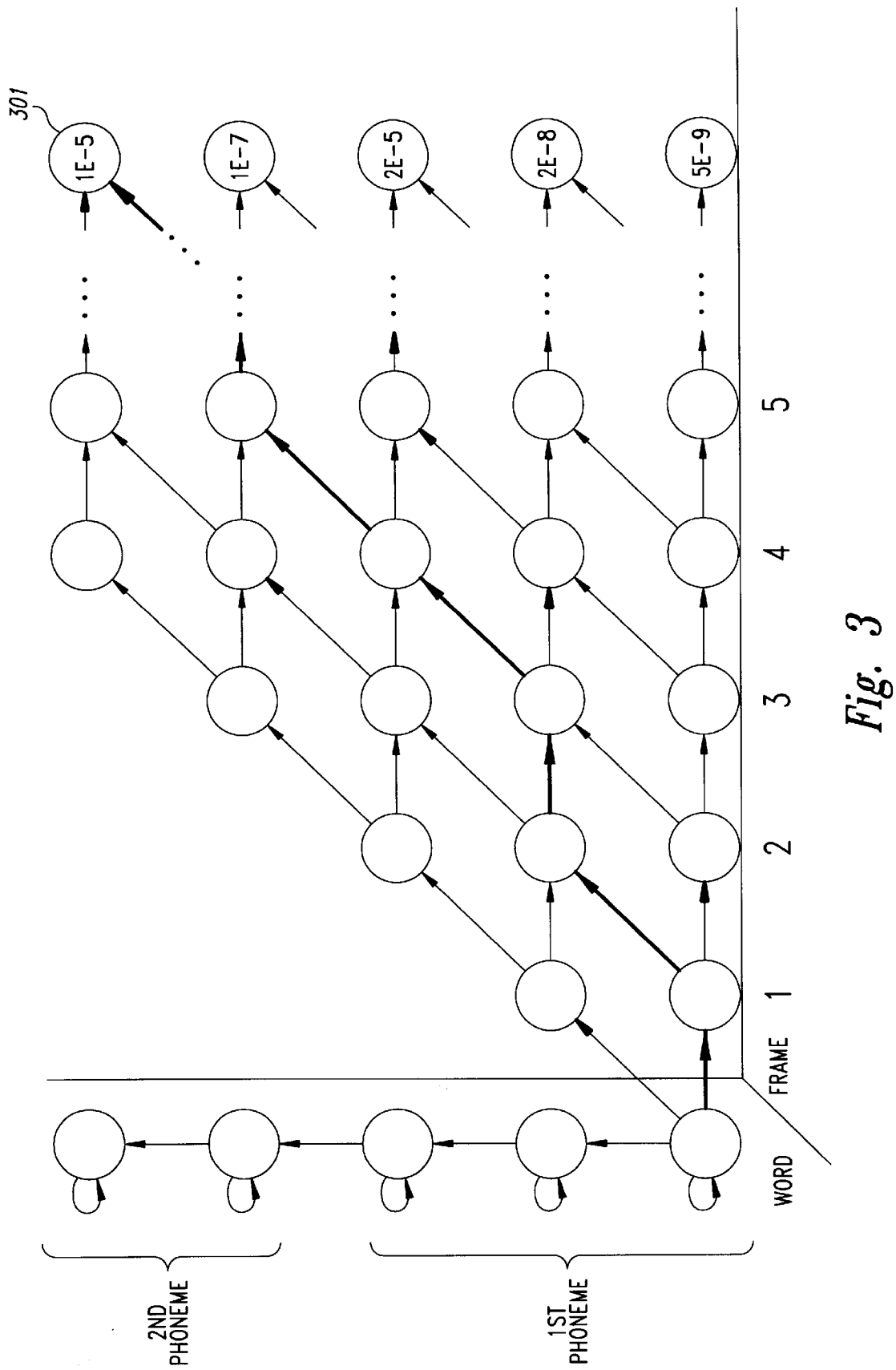
FIG. 3 illustrates a probability lattice for a word.

The present invention provides a method and system for dynamically selecting words for training a computer speech recognition (CSR) system. In one embodiment, the training system identifies which phonetic units, such as phonemes, are least accurately modeled by the CSR system. The training system then identifies words that contain one or more of these least accurately modeled phonemes. The training system prompts the speaker to speak these identified words. The training system then adapts the model of the phonemes corresponding to the spoken words. By selecting words that contain phonemes that are least accurately modeled, the training system can focus on training its model where the model deviates most from the speaker's actual speech pattern. Moreover, the speaker is not asked to speak words that are already accurately modeled.

The training system determines which phonemes are least accurately modeled by evaluating various utterances spoken by the speaker for which the corresponding word is known. The training system converts the utterances to codewords and then determines which phoneme each codeword would be considered part of during speech recognition by a process referred to as aligning the codewords with the phonemes. Once the alignment is complete, the training system determines, for each codeword, the accuracy of the model of the aligned phoneme at recognizing that the codeword is part of the phoneme. For example, if a codeword is aligned with a phoneme and the model predicts that there is a very low probability that that codeword is within that phoneme as compared to other phonemes, the accuracy of that model at recognizing that codeword as part of the phoneme is low. After the accuracy of phoneme models for each codeword is determined, the training system calculates the overall accuracy of the model at recognizing that the aligned codewords are part of the phoneme. The overall accuracy for a phoneme can be computed by averaging the accuracy for each codeword that is aligned with that phoneme. Those phonemes with lowest overall accuracies are least accurately modeled.

The training system selects words for training that include phonemes that are least accurately modeled. The training system may use several different selection techniques. The training system may identify a certain number of the least accurately modeled phonemes. The training system may then select any word that contains at least one of the identified phonemes. Alternatively, the training system may preferentially select words that contain more than one of the identified phonemes to minimize the number of words a speaker needs to speak to train on the identified phonemes. Also, the training system may preferentially select words that are commonly spoken to help ensure that the speaker is not asked to pronounce arcane words with which the speaker may not be familiar.

The training system aligns a sequence of codewords with the phonemes of a word by first generating a probability lattice for the codewords and the known word. The training system then identifies the most-probable state path that leads to the most-probable state. The identification of such a state path preferably uses a Viterbi-based algorithm. The training system then uses the state path to identify which codewords would be recognized as part of (aligned with) which phonemes.

The training system can collect speech for use in determining the accuracy of the phonetic model either by specifically prompting a speaker for training or by saving utterances that were misrecognized by the CSR system along with the correct words. The specific prompting would typically occur during a training session. The training system would start out by prompting the speaker to pronounce various pre-selected words and then adapt the model accordingly. The training system would then select words containing phonemes that are least accurately recognized and prompt the speaker to pronounce those words and adapt the model accordingly. The training system can iteratively perform such adaptation. If the collected speech is misrecognized utterances, then the training system would initially select words containing phonemes of those misrecognized utterances that are determined to be least accurately modeled. The determination of which phoneme models are less accurately modeled can be done by comparing the phoneme alignment of the utterance and misrecognized word against the phoneme alignment of the correct word. Factors that can be used in deriving the measure of phoneme model accuracy include: the number of times a phoneme is incorrectly recognized in the misrecognized word, the number of times a phoneme in the correct word is not recognized, and the difference in the probability values of the correct and incorrect phoneme models. The advantage of the use of misrecognized utterances is that training is based on phonemes in words that are actually used by the speaker during normal speech.

A preferred CSR system also determines automatically when training should occur. Normally, speakers consider it difficult to conduct a training session. Therefore, they are unlikely to initiate a training session unless the accuracy of the recognition system presents major problems. Moreover, because training is so difficult, speakers will often adapt their speech pattern to match the model. To make the training process more speaker-friendly, the CSR system can automatically initiate a short training session periodically or when enough senones are determined to be inaccurately modeled that training is deemed necessary. For example, a training session could be automatically initiated on a daily basis or initiated when 20 senones are noted to not be matching the model accurately enough.

The techniques of the present invention can also be used to tutor a speaker on proper pronunciation of words, for example, when the speaker is learning a new language. Rather than considering the phonemes to be inaccurately modeled, a tutoring system would consider that the phonemes are being mispronounced by the speaker. Thus, once the phonemes that are least accurately pronounced are identified, the tutoring system can place special emphasis on teaching the speaker how to pronounce words with those phonemes. Also, the tutoring system can grade the speakers pronunciation based on the accuracy of the spoken phonemes computed using the modeled phonemes.

In a preferred embodiment, the training system bases the likelihood that a given phoneme will contain a given codeword on an acoustic model probability that the phoneme contains that codeword. For each codeword, the training system ranks each phoneme according to its probability. That is, the phoneme with the highest probability is assigned the highest rank (i.e., a rank of 1). These ranks are then used when calculating the accuracy of the models. In particular, the training system calculates the average rank of the phonemes using all codewords that are aligned with it. The training system then selects words that contain those phonemes with low average ranks for training.

Figure 6:
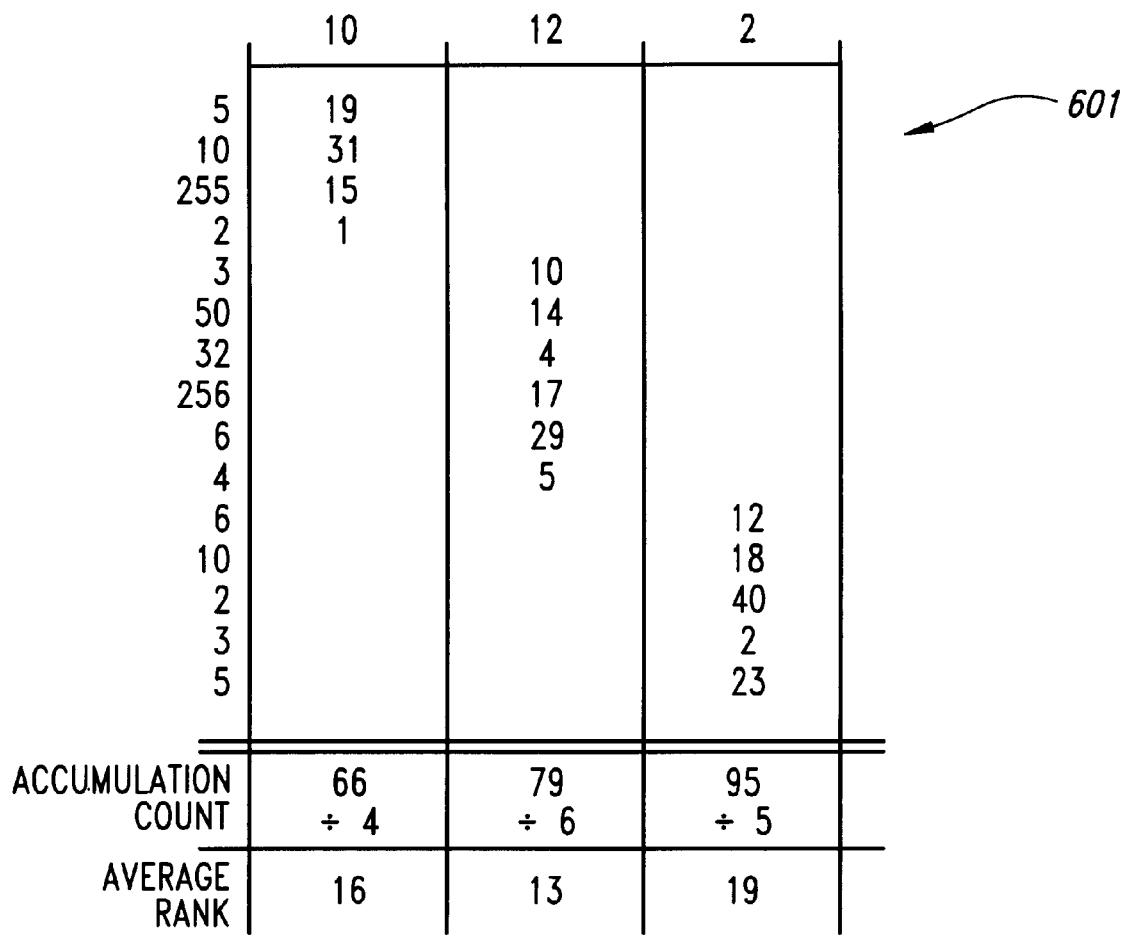
FIG. 6 shows a sample calculation of the average rank of the codewords that are aligned with phonemes.

FIGS. 4–6 illustrate a calculation of accuracies of various phonemes. This example illustrates the calculation based on the speaking of one word. However, in practice, such a calculation would be based on many words. The input word comprises the phonemes 10, 12, and 2. The training system divided the corresponding utterance into 15 frames with the following codewords: 5, 10, 255, 2, 3, 50, 32, 256, 6, 4, 6, 100, 2, 3, and 5. The training system then aligns the codewords with the phonemes. FIG. 4 shows the alignment of each codeword with a phoneme. The table 401 has a horizontal axis that corresponds to phonemes and a vertical axis that corresponds to frames. The entries of the table indicate the codewords with which each phoneme is aligned. Codewords 5, 10, 255, and 2 are aligned with phoneme 10; codewords 3, 50, 32, 256, 6, and 4 are aligned with phoneme 12; and codewords 6, 10, 2, 3, and 5 are aligned with phoneme 2.

FIG. 5A shows the acoustic model codeword/phoneme probability table. The table has a vertical axis corresponding to codewords and a horizontal axis corresponding to phoneme. Each entry in the table contains the probability that the corresponding phoneme contains that codeword. For example, the probability that phoneme 10 contains codeword 6 is 0.01, and the probability that phoneme 3 contains codeword 5 is 0.04. The sum of the probabilities of each column is 1.

FIG. 5B shows the codeword/phoneme rank table. This table contains, for each codeword, the rank of the probability for that codeword relative to each phoneme. For example, codeword 6 has a rank of 33 for phoneme 10, which means that codeword 6 is more likely in 32 other phonemes than it is in phoneme 10 and also that codeword 6 is more likely to be in phoneme 10 than 7 other phonemes (assuming a total of 40 phonemes). Thus, each row of the table contains an entry with a number from 1 to 40.

The rank of the phonemes for each codeword can be generated in several ways. For example, for each frame, the CSR system can identify an acoustic model probability that a phoneme can generate the codeword for that frame. For that frame, the phoneme with the highest probability is assigned a rank of 1, the phoneme with the second highest probability is assigned a rank of 2, and so on. The ranks can be calculated dynamically from the information from the codeword/phoneme probability table. FIG. 5C shows the rank of each phoneme for the codeword of each frame. These ranks for a frame can be generated by dynamically sorting the probabilities for all phonemes for that frame in a decreasing order. Alternatively, depending on the amount of storage available, the rank can be generated once as shown in the codeword/probability rank table.

FIG. 6 shows a sample calculation of the average rank of the phonemes using the frames that are aligned with those phonemes. The table 601 has a horizontal axis that corresponds to the phonemes and a vertical axis that corresponds to the codewords of the input utterance. Each entry of the table contains the rank of the corresponding phoneme for the aligned codeword. For example, codewords 5, 10, 225, and 2 are aligned with phoneme 10 and for these codewords the phoneme 10 has ranks of 19, 31, 15 and 1, respectively. The bottom of the table contains the sum of the ranks, the count of the aligned codewords, and the average rank. For example, the sum of the ranks for phoneme 10 is 66, the count of the aligned codewords is 4, and the average rank for phoneme 10 is therefore 16. As shown, the average rank for phoneme 12 is 13 and for phoneme 2 is 19. Since phoneme 12 has the highest average rank, the CSR system considers that phoneme to be more accurately modeled than the other two phonemes. Conversely, since phoneme 2 has the lowest average rank, the CSR system considers that phoneme to be less accurately modeled than the other two phonemes and would preferably select that phoneme for training.

Figure 7:
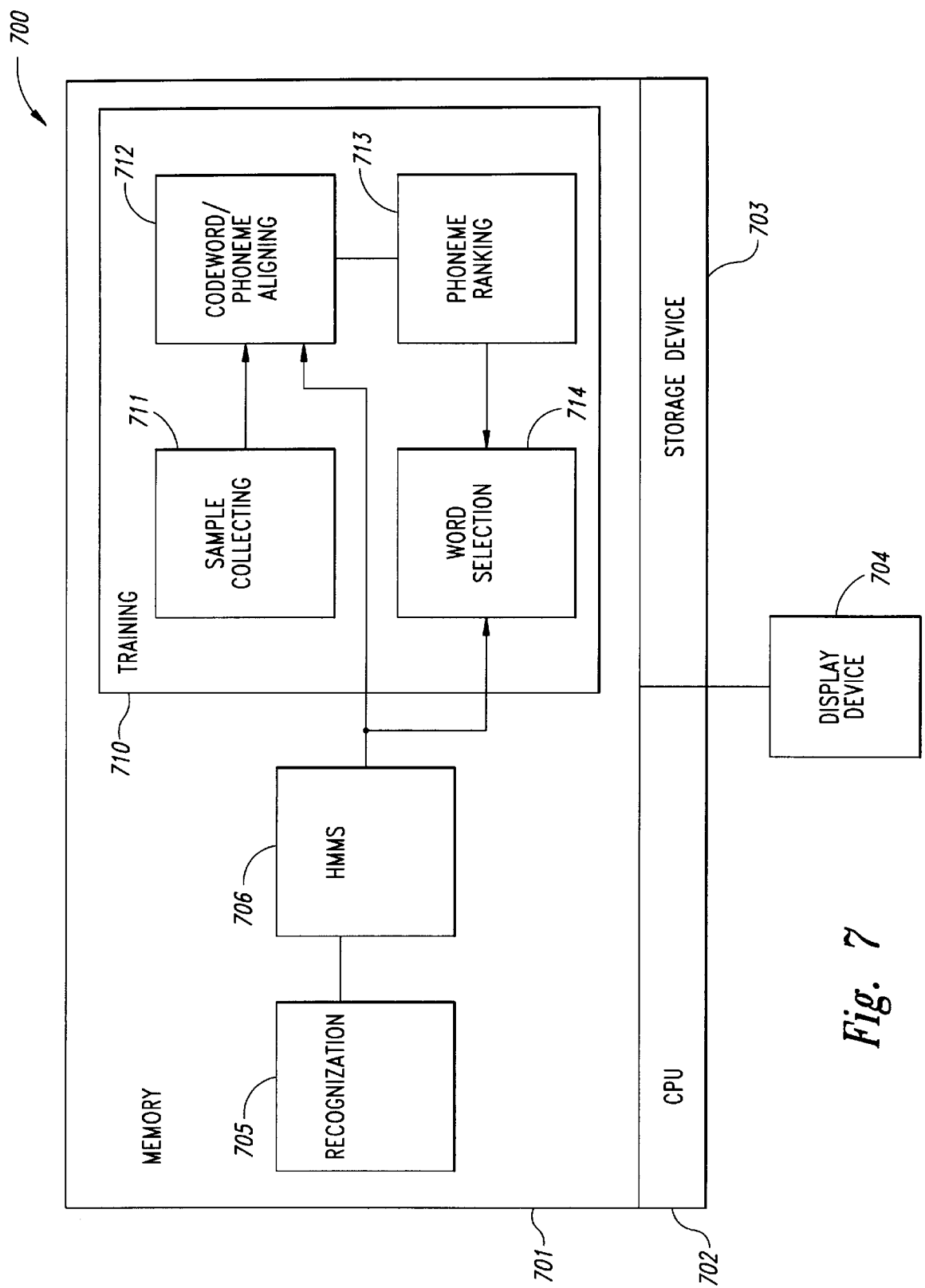
FIG. 7 is a block diagram of a computer system upon which a preferred training system executes.

FIG. 7 is a block diagram of a computer system upon which a preferred training system executes. The computer system 700 contains a memory 701, a central processing unit 702, storage devices 703, and display device 704. The training system may be stored permanently on a computer-readable storage medium, such as a disk and loaded into the memory of the computer system for execution. A preferred CSR system includes a recognition component 705, an HMM component 706, and a training component 710. The HMM component contains a hidden Markov model for each phoneme and a mapping of each word to its phonemes. The training component contains a sample collecting component 711, a codeword/phoneme-aligning component 712, a phoneme ranking component 714, and a word selection component 714. The sample collecting component collects various samples of utterances and their corresponding words by either specifically prompting a user or collecting misrecognized utterances. The sample collecting component converts the utterances into codewords. The codeword/phoneme-aligning component receives the codewords and their corresponding words and uses the HMMs to align each codeword with the phonemes of the words. The phoneme-ranking component uses the alignment of the codewords to the phonemes to calculate the average ranking of those phonemes using the codewords aligned with the phonemes. The word selection component then uses the average ranking to select words from the available vocabulary (not shown).

Figure 8:
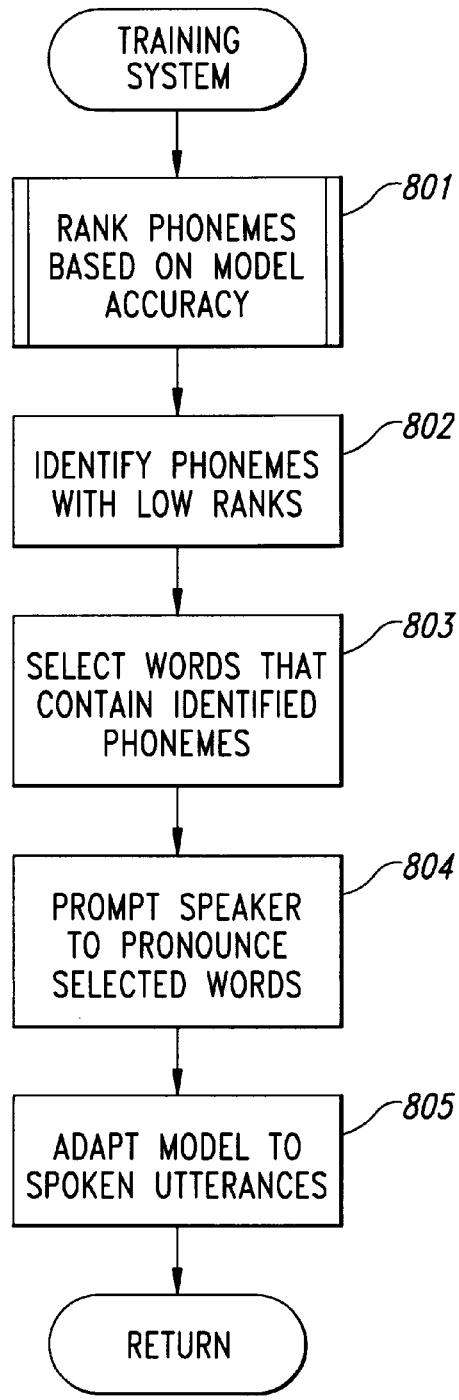
FIG. 8 is a flow diagram of the training system.

FIG. 8 is a flow diagram of the training system. In step 801, the training system ranks all phonemes based on the accuracy of the HMM for each phoneme as described in FIG. 9. In step 802, the training system identifies the phonemes that are most inaccurately modeled, that is, those with low ranks. In step 803, the training system selects words for training on the identified phonemes. In step 804, the training system prompts the speaker to pronounce each of the selected words. In step 805, the training system adapts the HMM based on the utterances for the selected words.

Figure 9:
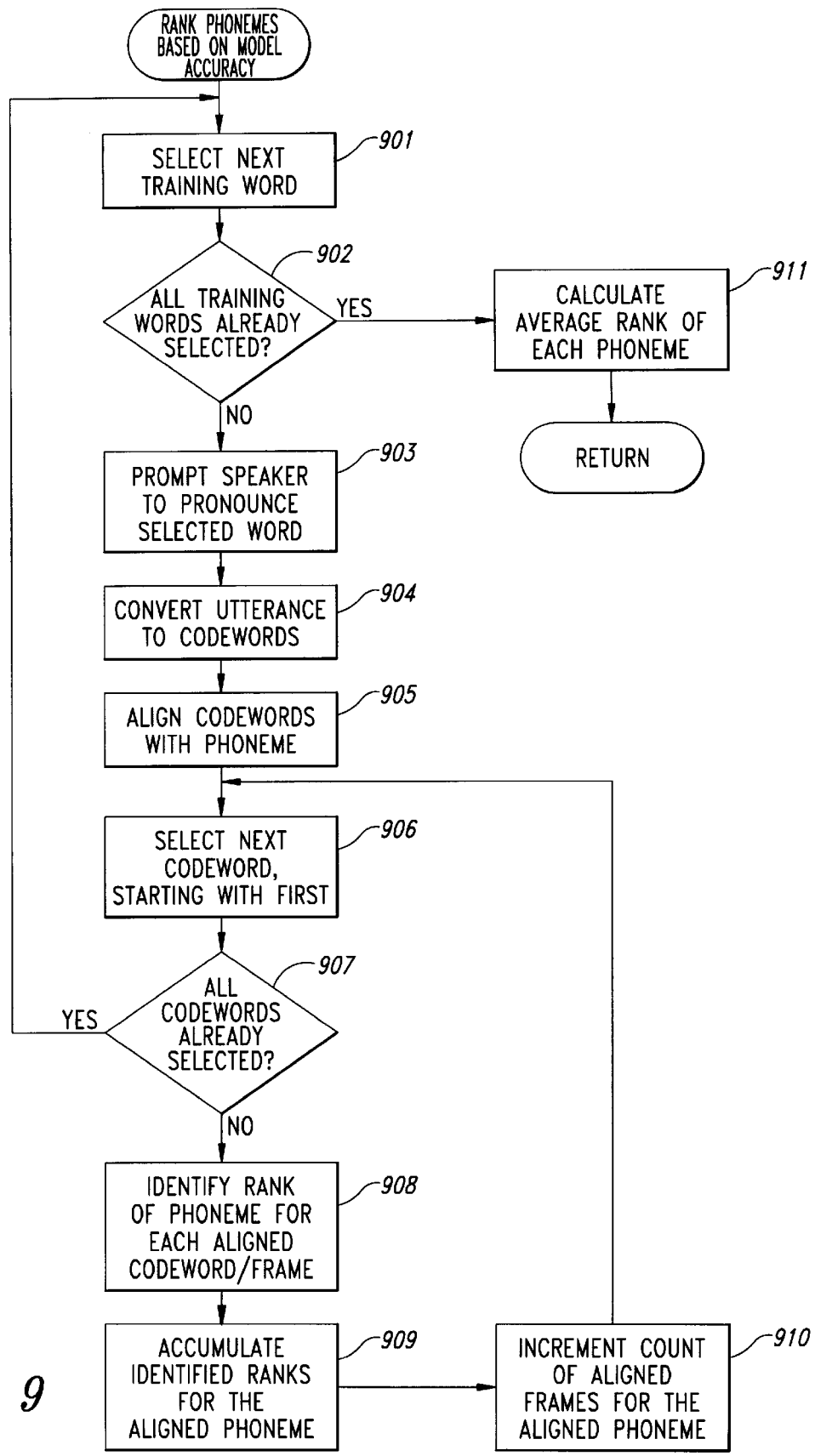
FIG. 9 is a flow diagram of a procedure for ranking phonemes based on the accuracy of the HMMs.

FIG. 9 is a flow diagram of a procedure for ranking phonemes based on the accuracy of the HMMs. In one embodiment, this procedure collects utterances to use in the ranking by prompting the speaker to pronounce training words. The procedure then calculates an indication of the accuracy of each phoneme. In step 901, the procedure selects a next training word starting with the first training word. The training words can be a pre-established or pre-defined set of training words or can be previously selected dynamically. In step 902, if all the training words have already been selected, then the procedure continues at step 911, else the procedure continues at step 903. In step 903, the procedure prompts the speaker to pronounce the selected word and receives the corresponding utterance. In step 904, the procedure converts the utterance into a sequence of codewords. In step 905, the procedure aligns each codeword with the phonemes of the word to which each most likely corresponds. In step 906–910, the procedure loops selecting each codeword and accumulating the rank of the phoneme aligned with that codeword. In step 906, the procedure selects the next codeword starting with the first. In step 907, if all codewords have already been selected, then the procedure loops to step 901 to select the next training word, else the procedure continues at step 908. In step 908, the procedure identifies the rank of the phoneme within the aligned codeword. In step 909, the procedure accumulates the identified rank for the aligned phoneme. In step 910, the procedure increments a count of the number of codewords that are aligned with that phoneme and loops to 906 to select the next codeword. In step 911, the procedure calculates the average rank of each phoneme by dividing the accumulated rank by the count and returns.

Although the present invention has been described in terms of a preferred embodiment, it is not intended that the invention be limited to these embodiments. Modifications within the spirit of the invention will be apparent to those skilled in the art. For example, although the present invention has been described in terms of recognizing discrete speech utterances, the invention can readily be used in continuous-speech recognition systems. In addition, the techniques of the present invention can be used with recognition system that use other than hidden Markov models. Also, the ranks of the phonemes can be calculated using measures other than acoustic model probability of generating the codeword, such as by using the count of phoneme misrecognitions using the recognizer. The ranks of phonetic units can be calculated based on different levels of aggregation other than the frame level. For example, the ranks can be aggregated at a speech segment level where a speech segment comprises multiple frames or variable length duration of speech. The ranks of phonetic units and selection of phonetic units in words selected for training can be performed at different levels of granularity such as phoneme, state in a phoneme, senone, a state in a context-dependent phoneme, or complete word itself. A context-dependent phoneme may depend on the context of multiple surrounding phonemes or words. A complete word may also be considered as a unit for modeling and selection in training. Using complete word as a unit is advantageous when the vocabulary size is small or when certain words are frequently used and confusable such as English alphabet letters and digits. A CSR system can use measures of the accuracy other than ranks. For example, a CSR system may use the difference or ratio of the probability of the phoneme and the best phoneme probability for that frame. Also, the rank or accuracy measure information across different frames can be combined using a technique other than averaging, such as computing the maximum, minimum, or weighted sum of the accuracy measure across multiple occurrences of the same phonetic unit. Finally, a CSR system can use collected information on the accuracy of the phoneme models (collectively referred to as the error profile) to improve the recognition process itself. For example, the probability of a phonetic unit can be boosted during recognition if the error profile shows that the chances of recognizing that phoneme model during its known occurrences is low as identified by the error profile. The scope of the present invention is defined by the claims that follow.

We claim:

1. A method in a computer system for dynamically selecting words for training a speech recognition system, the speech recognition system for recognizing a plurality of words, the speech recognition system having indications of phonemes that compose each word, the speech recognition system representing each spoken utterance by a sequence of codewords, the speech recognition system having a model for each phoneme, each model for generating a probability that each possible sequence of codewords corresponds to the modeled phoneme, the method comprising:

for each codeword, ranking the phonemes according to the probability that the codeword will be spoken as part of the phoneme;

collecting a plurality of spoken utterances for which the corresponding word is known;

for each collected utterance,
  converting the collected utterance to a sequence of codewords; and
  aligning each codeword in the sequence of codewords with a phoneme of the known word to which the collected utterance corresponds based on the phoneme models;
for each phoneme,
  accumulating the ranks of that phoneme with all codewords with which it is aligned in each of the collected utterances; and
  calculating an average rank of the phoneme by dividing the accumulated rank by a total number of codewords that are aligned with that phoneme in the collected utterances;
identifying a phoneme with low average rank; and
selecting words that contain the identified phoneme as words for training the speech recognition system.

2. The method of claim 1 wherein the models are hidden Markov models.

3. The method of claim 1 wherein the aligning uses a Viterbi-based alignment algorithm.

4. The method of claim 1 including presenting the selected words to a speaker for training.

5. The method of claim 4 wherein the probability that the word will be spoken by a speaker wherein the selected words are preferentially selected.

6. The method of claim 1 wherein the identifying of a phoneme includes identifying more than one phoneme with a low average rank and wherein the selecting selects words that contain more than one of the identified phonemes.

7. The method of claim 6 including presenting the selected words to a speaker for training.

8. The method of claim 7 wherein each word has a language model probability indicating the probability that the word will be spoken by a speaker and wherein the selected words are presented to the speaker in an order based on the language model probability of the selected words.

9. A method in a computer system for dynamically selecting words for training a speech recognition system, the speech recognition system for recognizing a plurality of words, the speech recognition system having indications of phonetic units that compose each word, the speech recognition system representing speech as a sequence of feature vectors, the speech recognition system having model for each phonetic unit, each model for generating a probability that each possible sequence of feature vectors corresponds to the modeled phonetic unit, the method comprising:
  collecting a plurality of spoken utterances for which the corresponding word is known;
  for each collected utterance,
    converting the collected utterance to a sequence of feature vectors; and
    aligning each feature vector in the sequence of feature vectors with a phonetic unit of the known word to which the collected utterance corresponds based on the models of the phonetic units of the known word;
  identifying from the feature vectors aligned with each phonetic unit a phonetic unit that is not accurately modeled; and
  selecting words that contain the identified phonetic unit as words for training the speech recognition system.

10. The method of claim 9 wherein identifying which phonetic units are least accurately modeled includes calculating a frame accuracy measure based on the aligned phonetic unit and feature vector, and calculating a combined accuracy measure for each unique phonetic unit by combining the frame accuracy measures that are based on that phonetic unit.

11. The method of claim 10 wherein the frame accuracy measure is a ratio of the probability that the feature vector is contained within the phonetic unit with which it is aligned to a highest probability that the feature vector is contained within any phonetic unit.

12. The method of claim 10 wherein the frame accuracy measure is a difference of the probability that the feature vector is contained within the phonetic unit with which it is aligned to a highest probability that the feature vector is contained within any phonetic unit.

13. The method of claim 10 wherein the frame accuracy measure is a rank of each phonetic unit based on the probability that those vector frames aligned with the phonetic unit will be spoken as part of the phonetic unit.

14. The method of claim 13 wherein the probability that those feature vectors aligned with the phonetic unit will be spoken as part of the phonetic unit is an acoustic model probability.

15. The method of claim 13 wherein the combined accuracy measure is an average of the probability that each feature vector that is aligned with that phonetic unit is contained within that phonetic unit.

16. The method of claim 13 wherein the combined accuracy measure is a maximum of the probabilities that each feature vector that is aligned with that phonetic unit is contained within that phonetic unit.

17. The method of claim 13 wherein the combined accuracy measure is a minimum of the probabilities that each feature vector that is aligned with that phonetic unit is contained within that phonetic unit.

18. The method of claim 13 wherein the combined accuracy measure is a weighted average of the probabilities that each feature vector that is aligned with that phonetic unit is contained within that phonetic unit.

19. The method of claim 9 wherein the identifying of which phonetic units are least accurately modeled is based on analysis of words misrecognized during recognition.

20. The method of claim 9 wherein the phonetic unit is a phoneme.

21. The method of claim 9 wherein the phonetic unit is a senone.

22. The method of claim 9 wherein the phonetic unit is a context-dependent phoneme state.

23. The method of claim 9 wherein the phonetic unit is a word.

24. The method of claim 9 wherein the feature vectors are vector quantized.

25. The method of claim 9 including training the speech recognition system based on the selected words.

26. The method of claim 25 wherein the training includes generating an error profile indicating a probability for each feature vector for each phonetic unit that reflects differences between the models and words spoken during training.

27. The method of claim 26 wherein the probabilities of the error profile are factored into the probabilities of the model during speech recognition.

28. A method in a computer system for tutoring a speaker on pronunciation of words, each word being phonetically represented by phonetic units, each spoken utterance being represented by a sequence of feature vectors, each phonetic unit having a model for generating a probability that various sequences of feature vectors corresponds to the modeled phonetic unit, the method comprising:
  collecting a plurality of spoken utterances from the speaker for which the corresponding word is known;

for each collected utterance,
  converting the collected utterance into a sequence of feature vectors; and
  aligning each feature vector in the sequence of feature vectors with a phonetic unit of the known word to which the collected utterance corresponds based on the model of the phonetic units of the known word;
  identifying, from the feature vectors aligned with each phonetic unit, a phonetic unit that is inaccurately spoken by the speaker; and
  selecting words that contain the identified phonetic units as words for tutoring the speaker.

29. The method of claim 28 including presenting the selected words to the speaker.

30. The method of claim 29 including receiving a speech utterance corresponding to each spoken word and evaluating the accuracy of the received speech utterances.

31. The method of claim 28 wherein identifying which phonetic units are least accurately modeled includes calculating a frame accuracy measure based on the aligned phonetic unit and feature vector, and calculating a combined accuracy measure for each unique phonetic unit by combining the frame accuracy measures that are based on that phonetic unit.

32. The method of claim 31 wherein the frame accuracy measure is a ratio of the probability that the feature vector is contained within the phonetic unit with which it is aligned to a highest probability that the feature vector is contained within any phonetic unit.

33. The method of claim 31 wherein the frame accuracy measure is a difference of the probability that the feature vector is contained within the phonetic unit with which it is aligned to a highest probability that the feature vector is contained within any phonetic unit.

34. The method of claim 31 wherein the frame accuracy measure is a rank of each phonetic unit based on the probability that those vector frames aligned with the phonetic unit will be spoken as part of the phonetic unit.

35. The method of claim 34 wherein the probability that those feature vectors aligned with the phonetic unit will be spoken as part of the phonetic unit is an acoustic model probability.

36. The method of claim 34 wherein the combined accuracy measure is an average of the probability that each feature vector that is aligned with that phonetic unit is contained within that phonetic unit.

37. The method of claim 36 wherein the phonetic unit is a phoneme.

38. The method of claim 36 wherein the phonetic unit is a senone.

39. The method of claim 36 wherein the phonetic unit is a context-dependent phoneme state.

40. The method of claim 36 wherein the phonetic unit is a word.

41. The method of claim 34 wherein the combined accuracy measure is a maximum of the probabilities that each feature vector that is aligned with that phonetic unit is contained within that phonetic unit.

42. The method of claim 34 wherein the combined accuracy measure is a minimum of the probabilities that each feature vector that is aligned with that phonetic unit is contained within that phonetic unit.

43. The method of claim 34 wherein the combined accuracy measure is a weighted average of the probabilities that each feature vector that is aligned with that phonetic unit is contained within that phonetic unit.

44. The method of claim 28 wherein the phonetic unit is a phoneme.

45. The method of claim 28 wherein the phonetic unit is a senone.

46. The method of claim 28 wherein the feature vectors are vector quantized.

47. A method in a computer system for selecting words for training a speech recognition system, the speech recognition system for recognizing a plurality of words, each word being spoken with phonetic units, the method comprising:
  receiving a plurality of spoken utterances for which the corresponding word is determined;
  for each phonetic unit of each of the determined words for which a spoken utterance is received, determining a context-dependent accuracy of the speech recognition system at recognizing the phonetic unit within the determined word;
  for each phonetic unit, determining a context-independent accuracy of the speech recognition system at recognizing the phonetic unit based on the context-dependent accuracies; and
  selecting words that contain phonetic units that are determined to have a lowest context-independent accuracy for training the speech recognition system.

48. The method of claim 47 wherein the words are selected based on context-dependent accuracy for training the speech recognition system.

49. The method of claim 47 wherein the speech recognition system has a model for each phonetic unit indicating a probability that a sequence of quantized vectors corresponds to the phonetic unit and wherein the determining of the context-dependent accuracy includes:
  for each received utterance,
    converting the spoken utterance into a sequence of quantized vectors;
    aligning each quantized vector in the sequence with a phonetic unit of the determined word based on the model for the phonetic units of the determined word; and
    identifying a probability that each aligned quantized vector is spoken as part of the phonetic unit with which it is aligned, wherein the identified probability is used to determine the context-dependent accuracy.

50. The method of claim 47 including presenting the selected words to a speaker for training.

51. The method of claim 50 wherein each word has a language model probability indicating the probability that the word will be spoken and wherein the selected words are presented to the speaker in an order based on the language model probability of the words.

52. The method of claim 47 wherein the selecting of word includes selecting words with more than one phonetic unit with a context-independent accuracy that is determined to be low.

53. The method of claim 52 including presenting the selected words to a speaker for training.

54. The method of claim 53 wherein each word has a language model probability indicating the probability that the word will be spoken and wherein the selected words are presented to the speaker in an order based on the language model probability of the selected words.

55. The method of claim 47 wherein the receiving of the plurality of spoken utterances occurs during a recognition process and wherein the recognition process periodically asks a speaker to train on the selected words.

56. The method of claim 55 wherein the training and recognizing are repeatedly performed.

57. The method of claim 47 wherein the receiving of the plurality of spoken utterances occurs during a recognition process and wherein when the recognition process identifies when the recognition process is incorrectly recognizing a certain portion of spoken utterances, and automatically prompting for training on the selected words.

58. The method of claim 47 wherein the receiving of the plurality of spoken utterances occurs during a recognition process and wherein the received spoken utterances were misrecognized during the recognition process.

59. A computer-readable medium containing instructions for causing a computer system to tutor a speaker on pronunciation of words, each word being spoken with phonetic units, by performing the steps of:
  receiving from the speaker a plurality of spoken utterances for which the corresponding word is known;
  identifying from the spoken utterances which phonetic units are inaccurately spoken by the speaker; and
  selecting words that contain an identified phonetic unit for tutoring the speaker.

60. The computer-readable medium of claim 59 including the step of presenting the selected words to the speaker.

61. The computer-readable medium of claim 60 including the step of receiving a speech utterance corresponding to each spoken word presented to the speaker and evaluating the accuracy of the received speech utterances.

62. The computer-readable medium of claim 59 wherein the phonetic unit is a phoneme.

63. The computer-readable medium of claim 59 wherein the phonetic unit is a senone.

64. A computer-readable medium containing instructions for causing a computer system to select words for training a speech recognition system, the speech recognition system for recognizing a plurality of words, the speech recognition system having a indication of phonetic units that compose each word, the speech recognition system having a model for each phonetic unit, the speech recognition system representing speech as a sequence of feature vectors, each model for indicating a probability that each possible sequence of feature vectors corresponds to the modeled phonetic unit, by performing the steps of:
  receiving a plurality of spoken utterances for which the corresponding word is determined;
  for each collected utterance,
    converting the collected utterance to a sequence of feature vectors; and
    aligning each feature vector in the sequence of feature vectors with a phonetic unit of the determined word to which the collected utterance corresponds based on the model of the phonetic units of the determined word;
  identifying from the feature vectors aligned with each phonetic unit which phonetic units are least accurately modeled; and
  selecting words that contain the identified phonetic units as words for training the speech recognition system.

65. The computer-readable medium of claim 64 wherein the identifying which phonetic units are least accurately modeled includes the step of calculating a rank of each phonetic unit based on the probability that those vectors aligned with the phonetic unit will be spoken as part of the phonetic unit.

66. The computer-readable medium of claim 65 wherein the probability that those feature vectors aligned with the phonetic unit will be spoken as part of the phonetic unit is an acoustic model probability.

67. The computer-readable medium of claim 64 including the step of training the speech recognition system based on the selected words.

68. The computer-readable medium of claim 67 wherein the training includes the step of generating an error profile indicating a probability for each feature vector for each phonetic unit that reflects differences between the models and words spoken during training.

69. The computer-readable medium of claim 68 wherein the probabilities of the error profile are factored into the probabilities of the model during speech recognition.

70. A method in a computer system for dynamically selecting words for training a speech recognition system, each word comprising phonetic units, the method comprising:
  collecting a plurality of spoken utterances for which the corresponding word is known;
  identifying from the spoken utterances which phonetic units are inaccurately modeled by the speech recognition system; and
  selecting words that contain an identified phonetic unit for training of the speech recognition system.

71. The method of claim 70 wherein the phonetic unit is a phoneme.

72. The method of claim 70 wherein the phonetic unit is a senone.

73. The method of claim 70 wherein the phonetic unit is a context-dependent phoneme state.

74. The method of claim 70 wherein the phonetic unit is a word.

75. The method of claim 70 wherein the speech recognition system has a model for each phonetic unit indicating a probability that a sequence of quantized vectors corresponds to the phonetic unit and wherein the identifying includes:
  for each collected utterance,
    converting the collected utterance into a sequence of quantized vectors;
    aligning each quantized vector in the sequence with a phonetic unit of the known word based on the model for the phonetic units of the determined word; and
    identifying a probability that each aligned quantized vector is spoken as part of the phonetic unit with which it is aligned.

76. The method of claim 70 including presenting the selected words to a speaker for training.

77. The method of claim 76 wherein each word has a language model probability indicating the probability that the word will be spoken and wherein the selected words are presented to the speaker in an order based on the language model probability of the words.

78. The method of claim 70 wherein the selecting of words includes selecting words with more than one phonetic unit that is inaccurately modeled.

79. The method of claim 78 including presenting the selected words to a speaker for training.

80. The method of claim 79 wherein each word has a language model probability indicating the probability that the word will be spoken and wherein the selected words are presented to the speaker in an order based on the language model probability of the selected words.

81. The method of claim 70 wherein the receiving of the plurality of spoken utterances occurs during a recognition process and wherein the recognition process periodically asks a speaker to train on the selected words.

82. The method of claim 81 wherein the training and recognizing are repeatedly performed.

83. The method of claim 70 wherein the receiving of the plurality of spoken utterances occurs during a recognition process and wherein when the recognition process identifies when the recognition process is incorrectly recognizing a certain portion of spoken utterances, training on the selected words.

84. The method of claim 70 wherein the receiving of the plurality of spoken utterances occurs during a recognition process and wherein the receive spoken utterance were misrecognized during the recognition process.

85. The method of claim 70 wherein the identifying of which phonetic units are inaccurately modeled includes:
    aligning the feature vectors of the spoken utterance with the phonetic units;
    calculating a frame accuracy measure for each feature vector based on the aligned phonetic unit and feature vector; and
    calculating a combined accuracy measure for each unique phonetic unit by combining the frame accuracy measures that are based on that phonetic unit.

86. The method of claim 85 wherein the frame accuracy measure is a ratio of the probability that the spoken utterance of that frame is contained within the phonetic unit with which it is aligned to a highest probability that the spoken utterance of that frame is contained with any phonetic unit.

87. The method of claim 85 wherein the frame accuracy measure is a difference of the probability that the spoken utterance of that frame is contained within the phonetic unit with which it is aligned to a highest probability that the spoken utterance of that frame is contained with any phonetic unit.

88. The method of claim 85 wherein the frame accuracy measure is an average of the probability that the spoken utterance of each frame that is aligned with that phonetic unit is contained within that phonetic unit.

89. The method of claim 85 wherein the frame accuracy measure is an average of a maximum of the probabilities that the spoken utterance of each frame that is aligned with that phonetic unit is contained within that phonetic unit.

90. The method of claim 85 wherein the frame accuracy measure is a minimum of the probabilities that the spoken utterance of each frame that is aligned with that phonetic unit is contained within that phonetic unit.

91. The method of claim 85 wherein the frame accuracy measure is a sum of a weighted average of the probabilities that the spoken utterance of each frame that is aligned with that phonetic unit is contained within that phonetic unit.

92. The method of claim 70 wherein the identifying of which phonetic units are inaccurately modeled includes counting the number of times that a phonetic unit is recognized in a misrecognized word during recognition.

93. The method of claim 70 wherein the identifying of which phonetic units are inaccurately modeled includes counting the number of times that a phonetic unit was not recognized in a correct word during recognition.

94. The method of claim 70 wherein the identifying of which phonetic units are inaccurately modeled is based on differences between probability values of correct and incorrect phoneme models.

95. The method of claim 70 wherein the phonetic unit is a context-dependent phoneme.

96. The method of claim 70 wherein the phonetic unit is a word.

97. The method of claim 70 wherein the identifying of which phonetic units are inaccurately modeled includes aligning a sequence of frames of the spoken utterances with phonetic units and calculating a rank of a phonetic unit based on a probability that the aligned sequences of frames is contained within that phonetic unit.

98. A computer system for dynamically selecting words for training a speech recognition system, each word comprising phonetic units, comprising:
    a sample collecting component that collects a plurality of spoken utterances for which the corresponding word is known and converts the spoken utterances to codewords;
    an aligning component that aligns codewords with phonetic units of each word;
    a phonetic unit ranking component that identifies from the spoken utterances which phonetic units are inaccurately modeled by the speech recognition system based on the aligned codewords; and
    a word selection component that selects words that contain a phonetic unit identified by the phonetic unit ranking component for training of the speech recognition system.

99. The computer system of claim 98 wherein the speech recognition system has a model for each phonetic unit indicating a probability that a sequence of quantized vectors corresponds to the phonetic unit, wherein the aligning component aligns each codeword with a phonetic unit of the determined word based on the model for the phonetic units of the determined word, and wherein the phonetic unit ranking component identifies a probability that each aligned codeword is spoken as part of the phonetic unit with which it is aligned.

100. The computer system of claim 98 wherein each word has a language model probability indicating the probability that the word will be spoken, and including a presenting component for presenting selected words to the speaker in an order based on the language model probability of the words.

101. The computer system of claim 98 wherein the word selection component selects words with more than one phonetic unit that is inaccurately modeled.

102. A method in a computer recognition system for evaluating accuracy of the recognition system at recognizing words, each word comprising phonetic units, the method comprising:
    collecting a plurality of spoken utterances for which the corresponding word is known; and
    identifying an accuracy of each phonetic unit by aligning frames of the spoken utterances with phonetic units and calculating a frame accuracy measure for each frame based on a probability that the spoken utterance of that frame is contained within the phonetic unit with which it is aligned.

103. The method of claim 102 wherein the frame accuracy measure is a ratio of the probability that the spoken utterance of that frame is contained within the phonetic unit with which it is aligned to a highest probability that the spoken utterance of that frame is contained within any phonetic unit.

104. The method of claim 102 wherein the frame accuracy measure is a difference of the probability that the spoken utterance of that frame is contained within the phonetic unit with which it is aligned to a highest probability that the spoken utterance of that frame is contained within any phonetic unit.

105. The method of claim 102 wherein the frame accuracy measure is an average of the probability that the spoken utterance of each frame that is aligned with that phonetic unit is contained within that phonetic unit.

106. The method of claim 102 wherein the frame accuracy measure is a maximum of the probabilities that the spoken utterance of each frame that is aligned with that phonetic unit is contained within that phonetic unit.

107. The method of claim 102 wherein the frame accuracy measure is a minimum of the probabilities that the spoken utterance of each frame that is aligned with that phonetic unit is contained within that phonetic unit.

108. The method of claim 102 wherein the frame accuracy measure is a weighted average of the probabilities that the spoken utterance of each frame that is aligned with that phonetic unit is contained within that phonetic unit.

109. The method of claim 102 wherein the calculating includes counting the number of times that a phonetic unit is not recognized in a misrecognized word during recognition.

110. The method of claim 102 wherein the calculating includes counting the number of times that a phonetic unit was not recognized in a correct word during recognition.

111. The method of claim 102 wherein the phonetic unit is a context-dependent phoneme.

112. The method of claim 102 wherein the phonetic unit is a word.

113. The method of claim 102 wherein the phonetic unit is a state of a phoneme.

114. The method of claim 102 wherein the phonetic unit is a senone.

115. A method in a computer recognition system for evaluating accuracy of the recognition system at recognizing words, each word comprising phonetic units, the method comprising:

collecting a plurality of spoken utterances for which the corresponding word is known; and identifying an accuracy of each phonetic unit by aligning frames of the spoken utterances with phonetic units and counting the number of times that a phonetic unit was not recognized in a correct word during recognition.

116. A method in a computer recognition system for evaluating accuracy of the recognition system at recognizing words, each word comprising phonetic units, the method comprising:

collecting a plurality of spoken utterances for which the corresponding word is known; and identifying an accuracy of each phonetic unit by aligning frames of the spoken utterances with phonetic units and counting the number of times that a phonetic unit is not recognized in a misrecognized word during recognition.

\* \* \* \* \*

UNITED STATES PATENT AND TRADEMARK OFFICE
CERTIFICATE OF CORRECTION

PATENT NO. : 5, 963,903
DATED : October 5, 1999
INVENTOR(S) : Hsiao-Wuen Hon et al.

It is certified that error appears in the above-identified patent and that said Letters Patent is hereby corrected as shown below:

Column 3, line 26, delete "a".

Column 3, line 41, delete "phonemes" insert --phoneme--.

Column 5, line 61, delete "ranks" insert --rank--

Column 8, line 18-19, delete "phoneme" insert --phonemes--.

Column 9, line 16, delete 714" insert --713--.

Column 10, line 15, delete "system" insert --systems--.

Column 10, line 32, insert "a" after Using.

Column 15, line 33, delete "a" insert --an--.

Signed and Sealed this

Twenty-fifth Day of July, 2000

Attest:

Q. TODD DICKINSON

*Attesting Officer*         *Director of Patents and Trademarks*